(12) United States Patent
Oguri et al.

(10) Patent No.: US 9,068,631 B2
(45) Date of Patent: Jun. 30, 2015

(54) AUTOMATIC TRANSMISSION

(75) Inventors: Kazuo Oguri, Hiroshima (JP); Kenichi Watanabe, Machida (JP); Takayoshi Urushibata, Shizuoka (JP)

(73) Assignee: JATCO LTD, Fuji-shi (JP)

( * ) Notice: Subject to any disclaimer, the term of this patent is extended or adjusted under 35 U.S.C. 154(b) by 292 days.

(21) Appl. No.: 13/485,064

(22) Filed: May 31, 2012

(65) Prior Publication Data

US 2012/0316026 A1    Dec. 13, 2012

(30) Foreign Application Priority Data

Jun. 7, 2011   (JP) ................................. 2011-126823

(51) Int. Cl.
*F16H 3/44*      (2006.01)
*F16H 3/66*      (2006.01)

(52) U.S. Cl.
CPC .......... *F16H 3/663* (2013.01); *F16H 2003/445* (2013.01); *F16H 2200/0043* (2013.01); *F16H 2200/2005* (2013.01); *F16H 2200/2023* (2013.01); *F16H 2200/2043* (2013.01)

(58) Field of Classification Search
None
See application file for complete search history.

(56) References Cited

U.S. PATENT DOCUMENTS

| | | | | |
|---|---|---|---|---|
| 3,776,066 A | * | 12/1973 | Piret | 475/148 |
| 4,082,171 A | * | 4/1978 | Lalin et al. | 192/70.2 |
| 4,331,044 A | * | 5/1982 | Bookout et al. | 475/56 |
| 5,525,117 A | * | 6/1996 | Morisawa et al. | 475/281 |
| 5,683,325 A | * | 11/1997 | Moroto et al. | 475/276 |
| 5,951,433 A | | 9/1999 | Tsukamoto et al. | |
| 6,436,003 B1 | | 8/2002 | Kleila et al. | |
| 7,083,537 B2 | * | 8/2006 | Knowles et al. | 475/116 |
| 7,896,145 B2 | * | 3/2011 | Kato et al. | 192/48.619 |
| 2010/0191429 A1 | | 7/2010 | Kuwahara et al. | |

FOREIGN PATENT DOCUMENTS

| | | |
|---|---|---|
| EP | 0 039 936 A2 | 11/1981 |
| EP | 1 164 315 A2 | 12/2001 |
| EP | 2 175 172 A1 | 4/2010 |
| JP | 10-169730 A | 6/1998 |

* cited by examiner

*Primary Examiner* — Robert Hodge
*Assistant Examiner* — Ryan Dodd
(74) *Attorney, Agent, or Firm* — Foley & Lardner LLP

(57) ABSTRACT

An automatic transmission includes: a Ravigneaux planetary gear set; first to fifth friction engagement elements; the first friction engagement element, the second friction engagement element, and the fifth friction engagement element being disposed on a front side which is nearer to the driving source than the output member, the third friction engagement element and the fourth friction engagement element being disposed on a rear side which is farther from the driving source than the output member, and a first drum member that includes an inner circumference on which the second friction engagement element is disposed, and an outer circumference on which the fifth friction engagement element is disposed, and that is connected with a front carrier plate located at a front end portion of the common carrier.

8 Claims, 11 Drawing Sheets

|  | 13R/C | 234/C | 12/B | 4/B | R/B |
|---|---|---|---|---|---|
| 1st | O | – | O | – | – |
| 2nd | – | O | O | – | – |
| 3rd | O | O | – | – | – |
| 4th | – | O | – | O | – |
| Rev | O | – | – | – | O |

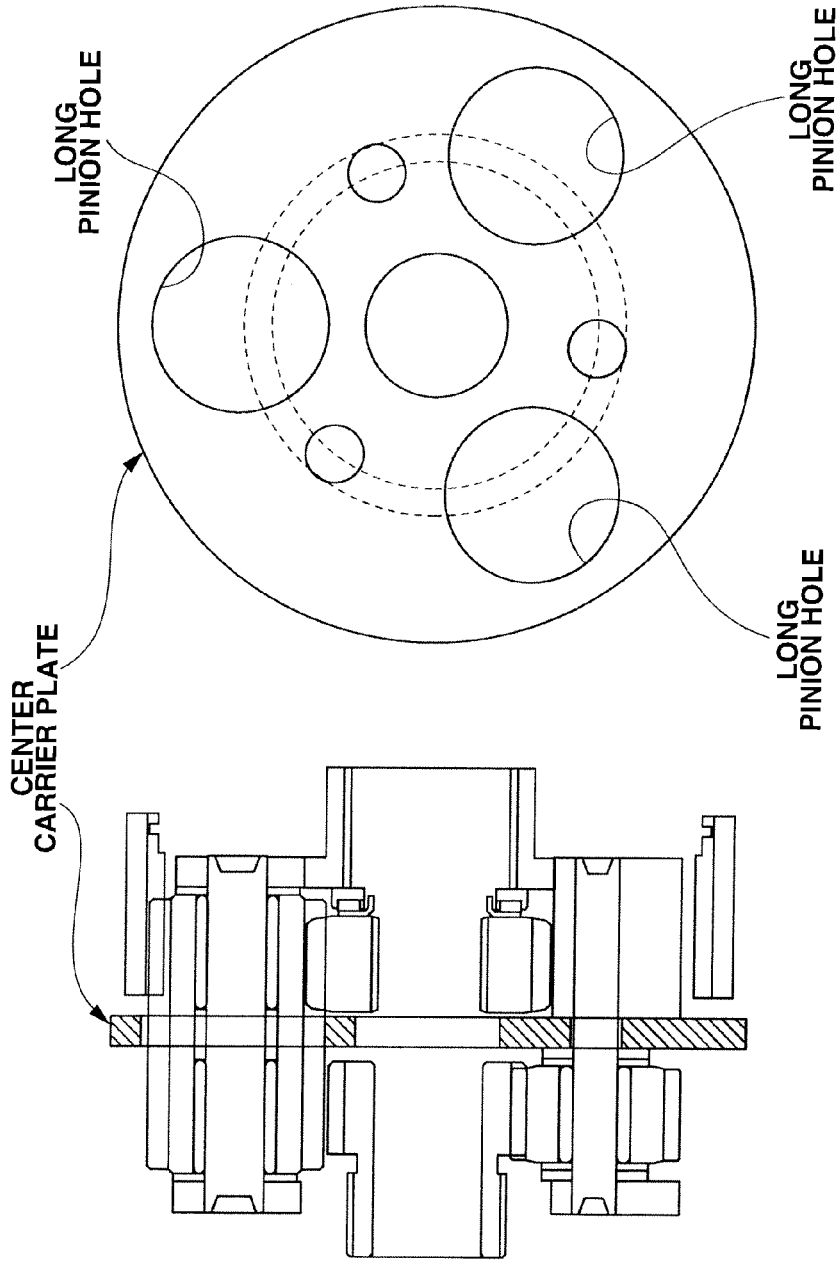

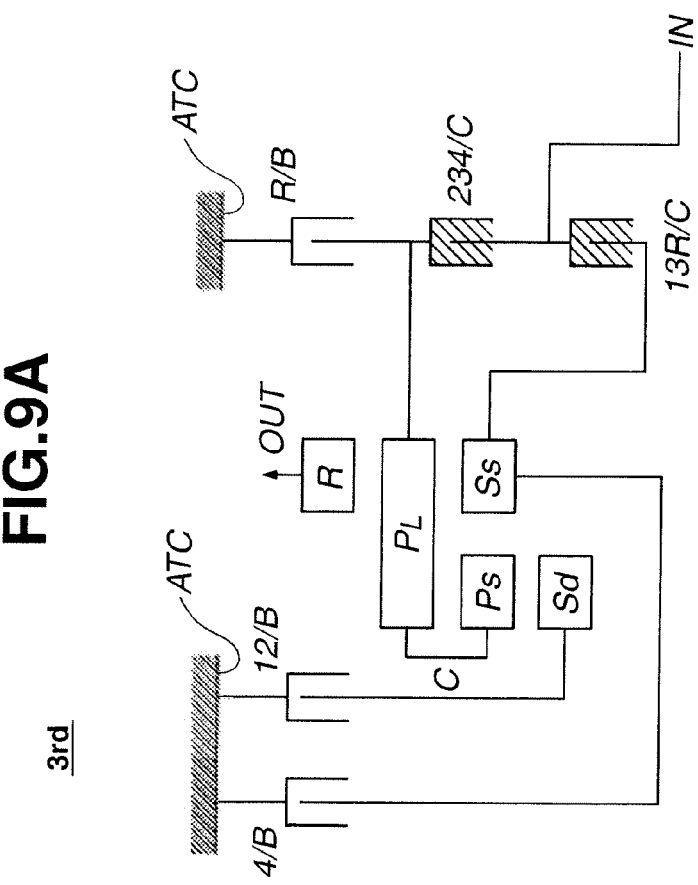
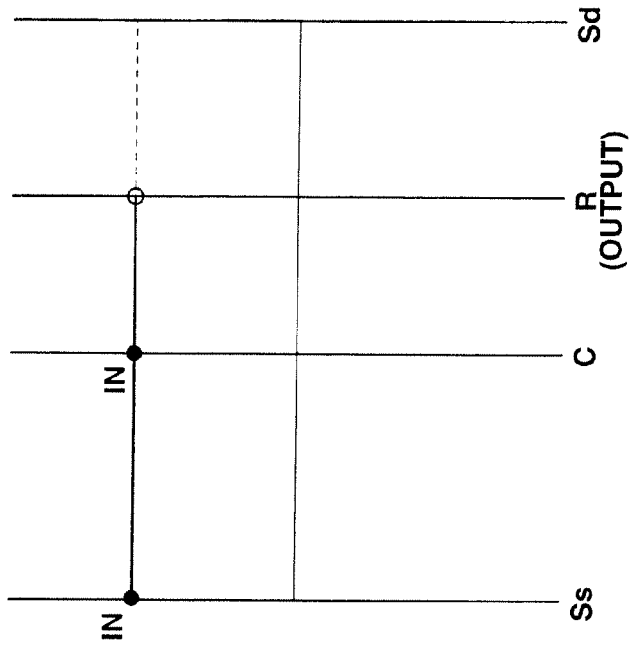
FIG.9A
FIG.9B

| | 13R/C | 234/C | 12/B | 4/B | R/B |
|---|---|---|---|---|---|
| TORQUE SHARING RATIO 1st | 1 | – | $(\alpha r(1+\alpha f)/(\alpha f(1-\alpha r))$ | – | – |
| 2nd | – | 1 | $\alpha r(1-\alpha r)$ | – | – |
| 3rd | $\alpha f$ | $\alpha f+1$ | – | – | – |
| 4th | – | 1 | – | $\alpha f(1+\alpha f)$ | – |
| Rev | 1 | – | – | – | $(1+\alpha f)/\alpha f$ |

AUTOMATIC TRANSMISSION

BACKGROUND OF THE INVENTION

This invention relates to an automatic transmission to attain four forward speeds and one reverse speed by combination of engagements and disengagements of five friction engagement elements by using Ravigneaux planetary gear set.

U.S. Pat. No. 5,951,433 (corresponding to Japanese Patent Application Publication No. 10-169730) discloses an automatic transmission arranged to attain four forward speeds and one reverse speed by combination of engagements and disengagements of two clutches and three brakes by using Ravigneux planetary gear set which is a compound type planetary gear set constituted by integrating two planetary gear trains, as shown in FIGS. 9(a) and 9(b) of the patent document.

SUMMARY OF THE INVENTION

However, there are following two problems in arrangement of the automatic transmission shown in FIG. 9(b) to attain the four forward speeds by using the Ravigneux planetary gear set.
(1) Inferiority in Vehicle Mountability There is a vehicle body frame on a rear end side of the automatic transmission. Accordingly, the vehicle mountability becomes better as the diameter of the automatic transmission on the rear end side becomes smaller. However, in the arrangement of FIG. 9(b) of the patent document, four friction engagement elements (C-1, C-2, B-2, and B-3) are disposed on the rear side of the output member (which is farther from the driving source). Accordingly, the case diameter of an automatic transmission case on the rear end side becomes large.
(2) Size Increase of Common Carrier and Cost Increase Rotary members from the common carrier to clutch C-2 are disposed between two sun gears. Accordingly, it is necessary to add one center carrier plate at a central portion of the common carrier. Consequently, the size of the common carrier is increased, and the cost is increased.

It is, therefore, an object of the present invention to provide an automatic transmission devised to solve the above mentioned problems, to improve a vehicle mountability, to suppress a size increase of a common carrier, and to decrease a cost.

According to one aspect of the present invention, an automatic transmission comprises: a Ravigneaux planetary gear set including a front sun gear, a rear sun gear, a ring gear, a long pinion gear engaged with the front sun gear and the ring gear, a short pinion gear engaged with the rear sun gear and the long pinion gear, and a common carrier rotatably supporting the long pinion gear and the short pinion gear; an input member arranged to input a rotation of a driving source; a first friction engagement element selectively connecting the input member and the front sun gear; a second friction engagement element selectively connecting the input member and the common carrier; a third friction engagement element selectively fixing the rear sun gear to an automatic transmission case; a fourth friction engagement element selectively fixing the front sun gear to the automatic transmission case; a fifth friction engagement element selectively fixing the common carrier to the automatic transmission case; an output member constantly connected with the ring gear, the automatic transmission being configured to attain four forward speeds and one reverse speed by a simultaneous engagement of two friction engagement elements selected from the first to fifth friction engagement elements, the first friction engagement element, the second friction engagement element, and the fifth friction engagement element being disposed on a front side which is nearer to the driving source than the output member, the third friction engagement element and the fourth friction engagement element being disposed on a rear side which is farther from the driving source than the output member, and a first drum member that includes an inner circumference on which the second friction engagement element is disposed, and an outer circumference on which the fifth friction engagement element is disposed, and that is connected with a front carrier plate located at a front end portion of the common carrier.

BRIEF DESCRIPTION OF THE DRAWINGS

FIGS. 6A and 6B are illustrative views showing a center carrier plate disposed between two sun gears of Ravigneaux planetary gear set of an automatic transmission of a comparative example.

FIG. 7A is a skeleton diagram at the first speed. FIG. 7B is a speed diagram at the first speed.

FIG. 8A is a skeleton diagram at the second speed. FIG. 8B is a speed diagram at the second speed.

FIGS. 9A and 9B are explanatory diagrams showing a shift operation at a third speed (3rd) in the automatic transmission according to the first embodiment.

FIG. 9A is a skeleton diagram at the third speed. FIG. 9B is a speed diagram at the third speed.

FIG. 10A is a skeleton diagram at the fourth speed. FIG. 10B is a speed diagram at the fourth speed.

FIG. 11A is a skeleton diagram at the reverse speed. FIG. 11B is a speed diagram at the reverse speed.

DETAILED DESCRIPTION OF THE INVENTION

Hereinafter, an automatic transmission according to a first embodiment of the present invention will be explained with reference to the accompanying drawings.

First, a structure will be explained. The structure of the automatic transmission according to the first embodiment will be explained hereinafter with respect to "overall structure", "shift structure", "structure of friction engagement elements disposed on rear side", and "structure of friction engagement elements disposed on front side".

[Overall Structure]

Figure 1:
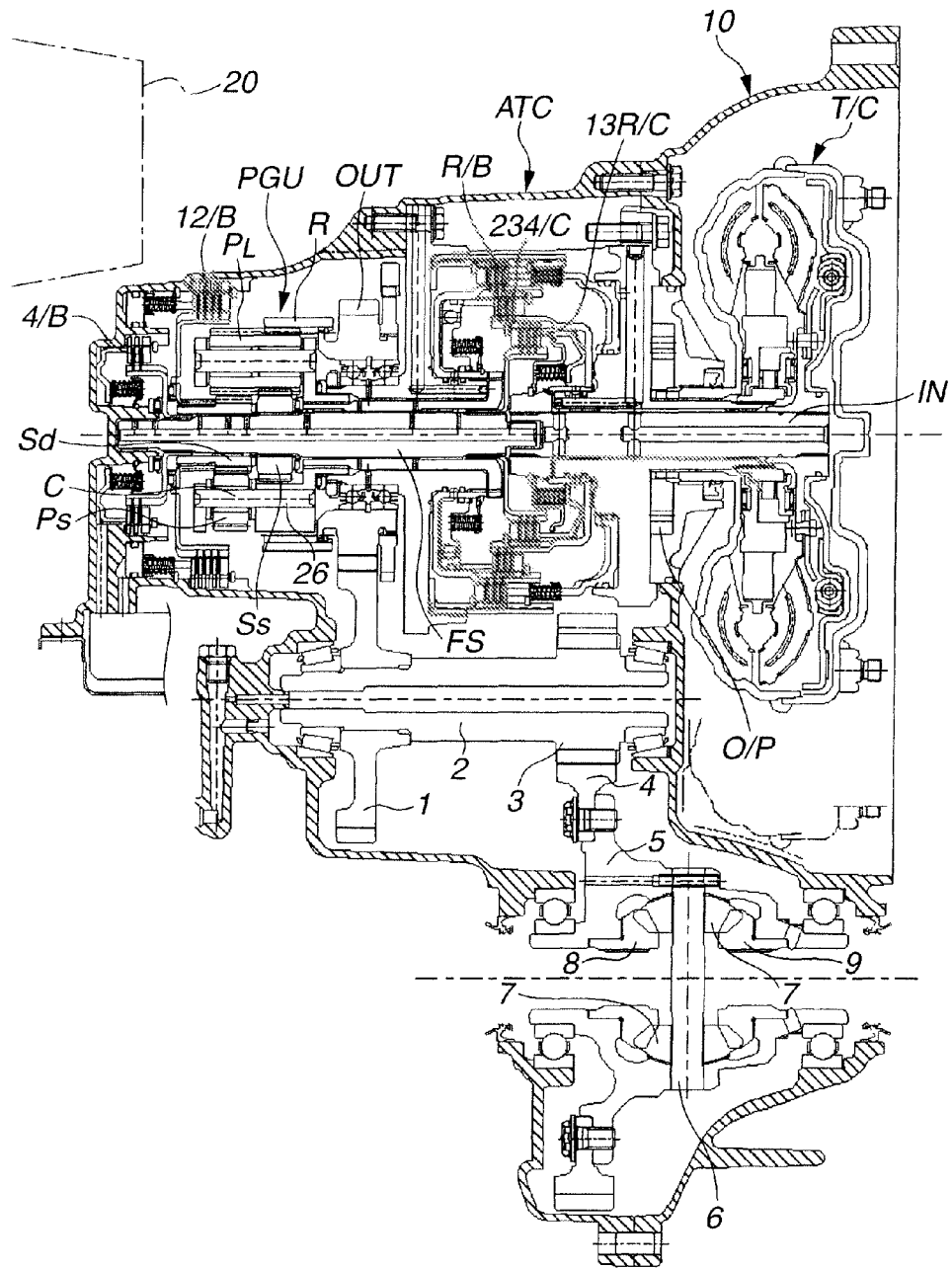
FIG. 1 is a longitudinal sectional view showing an overall structure of an automatic transmission according to a first embodiment of the present invention.
Figures 2, 3:
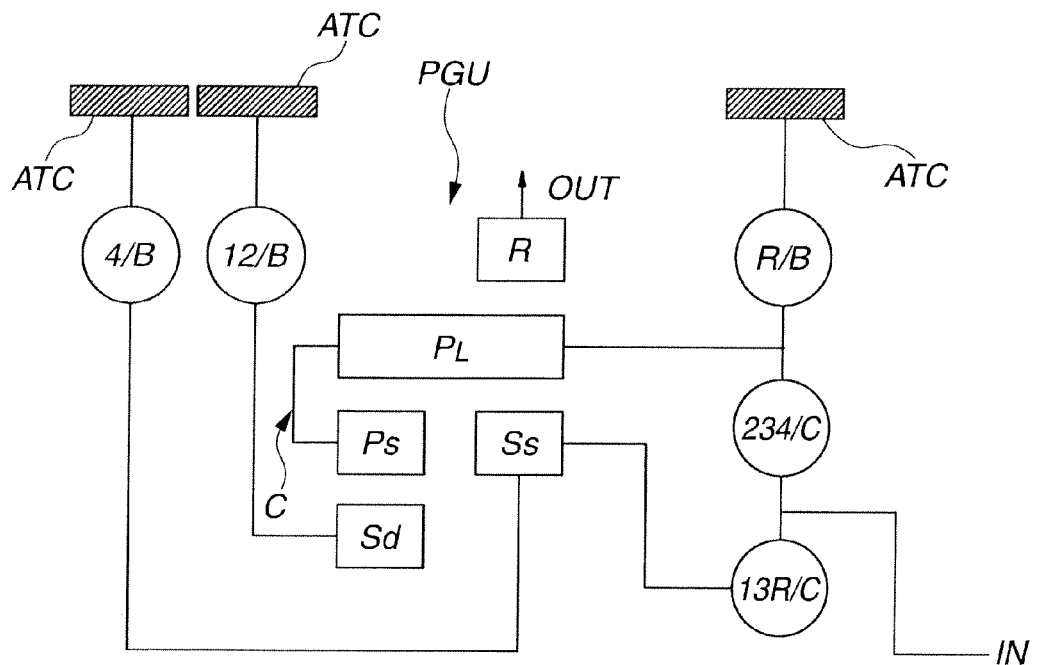
FIG. 2 is a skeleton diagram showing the automatic transmission of FIG. 1.
FIG. 3 is a table showing an engagement schedule in the automatic transmission according to the first embodiment for attaining four forward speeds and one reverse speed by simultaneous engagement of two friction engagement elements selected from five friction engagement elements.

FIG. 1 is a longitudinal sectional view showing the overall structure of the automatic transmission according to the first embodiment. FIG. 2 is a skeleton diagram showing the automatic transmission according to the first embodiment. A planetary gear set structure and a friction engagement element structure of the automatic transmission according to the first embodiment will be explained by referring to FIG. 1 and FIG. 2.

As shown in FIGS. 1 and 2, the automatic transmission according to the first embodiment includes Ravigneaux planetary gear set PGU, an input shaft IN (input member), an output gear OUT (output member), a first clutch 13R/C (first friction engagement element), a second clutch 234/C (second friction engagement element), a third brake 12/B (third friction engagement element), a fourth brake 4/B (fourth friction engagement element), a fifth brake R/B (fifth friction engagement element), and an automatic transmission case ATC.

Ravigneaux planetary gear set PGU is a compound planetary gear set constituted by integrating two planetary gear trains of a single pinion planetary gear set and a double pinion planetary gear set. As shown in FIGS. 1 and 2, this Ravigneaux planetary gear set PGU includes a front sun gear Ss; a rear sun gear Sd; a ring gear R; a long pinion gear $P_L$ engaged with front sun gear Ss and ring gear R; a short pinion gear $P_S$ engaged with rear sun gear Sd and long pinion gear $P_L$; and a common carrier C rotatably supporting long pinion gear $P_L$ and short pinion gear $P_S$.

As shown in FIG. 1, input shaft IN is arranged to receive a driving torque transmitted from an engine (driving source) (not shown) through a torque converter T/C with a lock-up clutch. A front sun gear shaft FS is provided coaxially with this input shaft IN. Front sun gear Ss of Ravigneaux planetary gear set PGU is fit over and splined to front sun gear shaft FS.

As shown in FIG. 1, output gear OUT is constantly connected with ring gear R. The output rotation of output gear OUT is transmitted through a counter gear 1→a counter shaft 2→a final reduction gear 3→a drive gear 4→a differential gear case 5. The output rotation transmitted to differential gear case 5 is transmitted through a pinion mate shaft 6 rotating as a unit with differential gear case 5→pinions 7 and 7, and then transmitted from a pair of side gears 8 and 9 engaged with pinions 7 and 7 to left and right drive shafts (not shown) and left and right drive wheels (not shown).

First clutch 13R/C is a multiple-plate friction engagement clutch selectively connecting input shaft IN and front sun gear Ss (=front sun gear shaft FS) at the first speed (1st), the third speed (3rd), and the reverse speed (Rev).

Second clutch 234/C is a multiple-plate friction engagement clutch selectively connecting input shaft IN and common carrier C at the second speed (2nd), the third speed (3rd), and the fourth speed (4th).

Third brake 12/B is a multiple-plate friction engagement brake selectively fixing rear sun gear Sd to automatic transmission case ATC at the first speed (1st) and the second speed (2nd).

Fourth brake 4/B is a multiple-plate friction engagement brake selectively fixing front sun gear Ss (=front sun gear shaft FS) to automatic transmission case ATC at the fourth speed.

Fifth brake R/B is a multiple-plate friction engagement brake selectively fixing common carrier C to automatic transmission case ATC at the reverse speed (Rev).

As shown in FIG. 1, automatic transmission case ATC receives, within an internal space thereof, Ravigneaux planetary gear set PGU, the five friction engagement elements 13R/C, 234/C, 12/B, 4/B, and R/B, and so on. A converter housing 10 is connected with the driving source's side (right side in FIG. 1) of this automatic transmission case ATC. Torque converter T/C is disposed within converter housing 10. An oil pump O/P arranged to be driven by the engine (driving source) is disposed at a connection portion between automatic transmission case ATC and converter housing 10. Besides, in FIG. 1, a numeral 20 is a vehicle body frame.

FIG. 3 is a table showing an engagement schedule in the automatic transmission according to the first embodiment for attaining the four forward speeds and the one reverse speed by simultaneous engagement of two friction engagement elements selected from the five friction engagement elements. Hereinafter, the shift structure for attaining the gear stages in the automatic transmission according to the first embodiment will be explained with reference to FIG. 3.

As shown in FIG. 3, the first speed (1st) is established by connecting input shaft IN and front sun gear Ss and fixing rear sun gear Sd to the case by the simultaneous engagement of first clutch 13R/C and third brake 12/B.

As shown in FIG. 3, the second speed (2nd) is established by connecting input shaft IN and common to carrier C and fixing rear sun gear Sd to the case by the simultaneous engagement of second clutch 234/C and third brake 12/B.

As shown in FIG. 3, the third speed (3rd) is established by connecting input shaft IN, front sun gear Ss, and common carrier C by the simultaneous engagement of first clutch 13R/C and second clutch 243/C.

As shown in FIG. 3, the fourth speed (4th) is established by connecting input shaft IN and common carrier C and fixing front sun gear Ss to the case by the simultaneous engagement of second clutch 234/C and fourth brake 4/B.

As shown in FIG. 3, the reverse speed (Rev) is established by connecting input shaft IN and front sun gear Ss and fixing common carrier C to the case by the simultaneous engagement of first clutch 13R/C and fifth brake R/B.

As is evidence from the engagement schedule table of FIG. 3, upshift and downshift between two adjacent gear stages from the first speed (1st) to the fourth speed (4th) are performed by a changeover (replacement) shift of two friction engagement elements. In this case, the changeover shift represents that one of the two friction engagement elements in the simultaneous engagement at the gear stage before the shift is held to the engagement state, the other of the two friction engagement elements is disengaged, and a new (another) friction engagement element is engaged, so as to proceed to the gear stage after the shift. For example, the upshift from the first speed (1st) to the second speed (2nd) is performed by holding third brake 12/B to the engagement state, disengaging first clutch 13R/C, and engaging second clutch 234/C.

[Structure of Friction Engagement Elements Disposed on Rear Side]

As shown in FIGS. 1 and 2, the five friction engagement elements are disposed in the front side region of the output gear which is nearer to the driving source than the output gear (which is between the output gear and the driving source), or in the rear side region which is farther from the driving source than the output gear OUT. In this case, in FIG. 1, the rear side region, the output gear OUT, the front side region, and the driving source (not shown) are arranged in this order from the left side toward the right side. Hereinafter, the structures of the friction engagement elements disposed in the rear side region which is farther from the driving source than the output gear OUT is explained with reference to FIG. 4.

Figure 4:
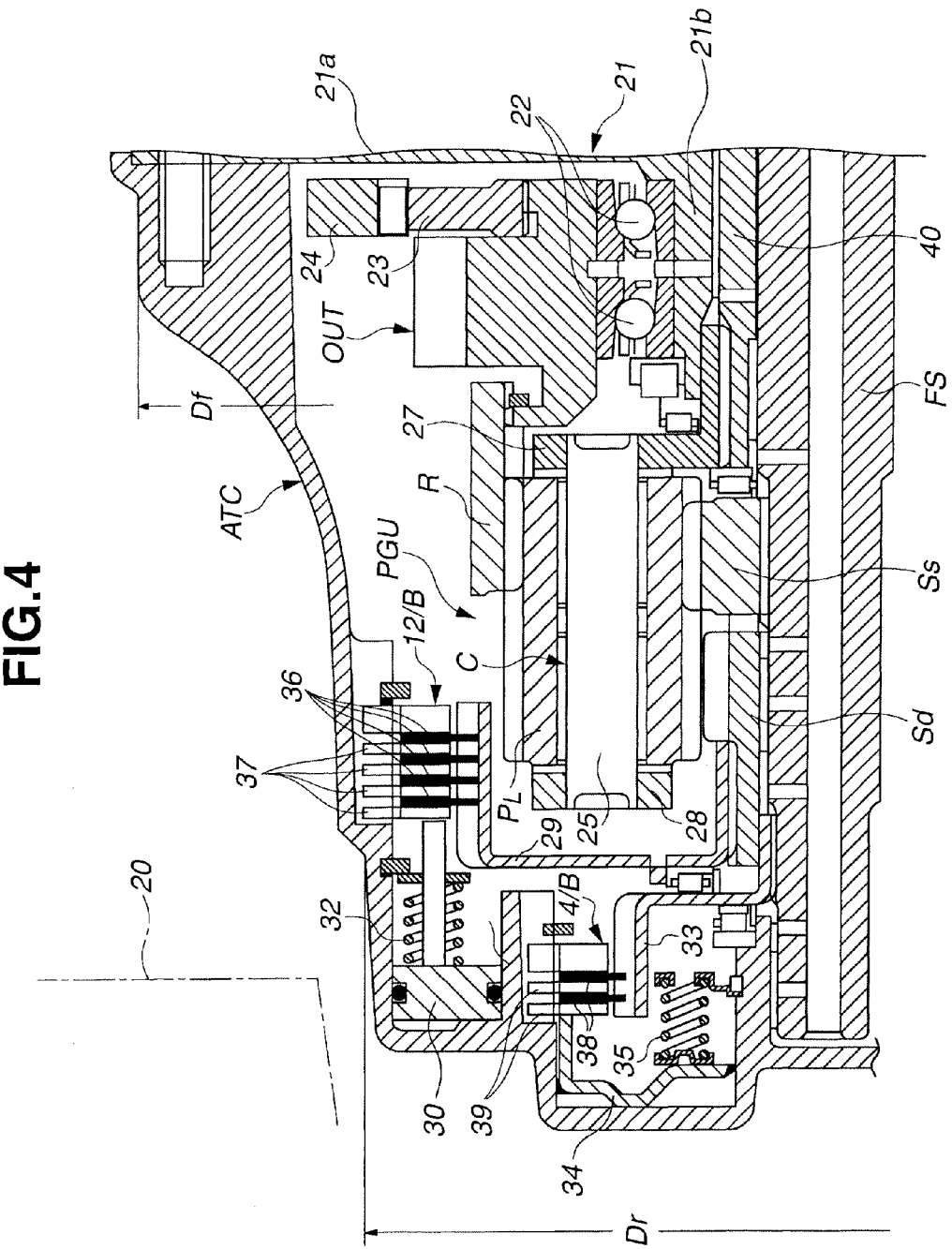
FIG. 4 is a sectional view showing a rear side of the automatic transmission according to the first embodiment, which is farther from a driving source than an output gear.

In the rear side region which is farther from the driving source than the output gear OUT, Ravigneaux planetary gear set PGU and two friction engagement elements of third brake 12/B and fourth brake 4/B are disposed within the internal space of automatic transmission case ATC, as shown in FIG. 4.

Output gear OUT is supported by a cylindrical portion 21b of an intermediate wall 21 through a bearing 22. Intermediate wall 21 is disposed on the front side (the right side in FIG. 4) of output gear OUT. Intermediate wall 21 includes a wall portion 21a which is connected to automatic transmission case ATC, and which extends in the radial direction; and cylindrical portion 21b extending from wall portion 21a in the axial direction toward the rear side (the left side in FIG. 4). Output gear OUT includes a rear end portion constantly connected to ring gear R, and a front end portion constantly connected to a parking gear 23. This parking gear 23 is disposed to be capable of engaging with a parking pawl 24.

Ravigneaux planetary gear set PGU is disposed adjacent to the rear side of output gear OUT, on an outer circumference of front sun gear shaft FS. An outside diameter of Ravigneaux planetary gear set PGU is defined by an outside diameter of ring gear R. An axial length of Ravigneaux planetary gear set PGU is defined by an axial length of common carrier C. In front sun gear shaft FS, front sun gear Ss is splined to the outer circumference of front sun gear shaft FS, and rear sun gear Sd is rotatably supported at the outer circumference position of front sun gear shaft FS. Common carrier C includes a long pinion shaft 25 supporting long pinion gear $P_L$; a short pinion shaft 26 (cf. FIG. 1) supporting short pinion gear $P_S$; and a front carrier plate 27 and a rear carrier plate 28 which support pinion shafts 25 and 26 at both end positions of pinion shafts 25 and 26.

Third brake 12/B is disposed radially outside Ravigneaux planetary gear set PGU, at an axial position at which third brake 12/B is overlapped with Ravigneaux planetary gear set PGU in the radial direction. Four friction plates (inner plates) 36 of third brake 12/B are fit over and splined to an outer circumference of a second hub member 29 which passes through a rear side of common carrier C, and which is splined to rear sun gear Sd. Four friction mating plates (outer plates) 37 of third brake 12/B are fit in and splined to automatic transmission case ATC. A third brake piston 30 of third brake 12/B is disposed on the rear side of third brake 12/B of friction plates 36 and friction mating plates 37 which are alternately disposed, in a piston cylinder which is a large annular groove that is formed by automatic transmission case ATC and an axially protruding case portion 31 located within automatic transmission case ATC. A third brake return spring 32 is disposed between automatic transmission case ATC and third brake piston 30.

Fourth brake 4/B is disposed radially inside third brake 12/B, at an axial position at which fourth brake 4/B is overlapped with third brake piston 30 in the radial direction. Two friction plates 38 of fourth brake 4/B are fit over and splined to an outer circumference of a third hub member 33 which passes through the rear side of second hub member 29 and a region radially inside rear sun gear Sd, and which is splined to front sun gear shaft FS. Two friction mating plates 39 of fourth brake 4/B are fit in and splined to axially protruding case portion 31. A fourth brake piston 34 of fourth brake 4/B is disposed on the rear side of fourth brake 4/B, in a piston cylinder which is a small annular groove that is formed by automatic transmission case ATC. A fourth brake return spring 35 is disposed between automatic transmission case ATC and fourth brake piston 34.

On the other hand, automatic transmission case ATC has a shape according to arrangement of output gear OUT, Ravigneaux planetary gear set PGU, third brake 12/B, and fourth brake 4/B, as mentioned above. That is, automatic transmission case ATC has a case diameter which gradually decreases from a case diameter Df at the position of output gear OUT to the position of third brake 12/B. Automatic transmission case ATC has a small case diameter Dr (<Df) on the rear end side on which third brake piston 30 and fourth brake 4/B are disposed. In this way, the shape of automatic transmission case ATC is set so as to avoid interference with vehicle body frame 20 disposed adjacent to the rear end side of the automatic transmission.

[Structure of Friction Engagement Elements Disposed on Front Side]

As shown in FIGS. 1 and 2, the five friction engagement elements are disposed to be divided, by output gear OUT as the border, into the front side region which is nearer to the driving source than output gear OUT, and the rear side region which is farther from output gear OUT than the driving source. Hereinafter, the structure of the friction engagement elements disposed on the front side which is nearer to the driving source than output gear OUT will be explained by referring to FIG. 5.

Figure 5:
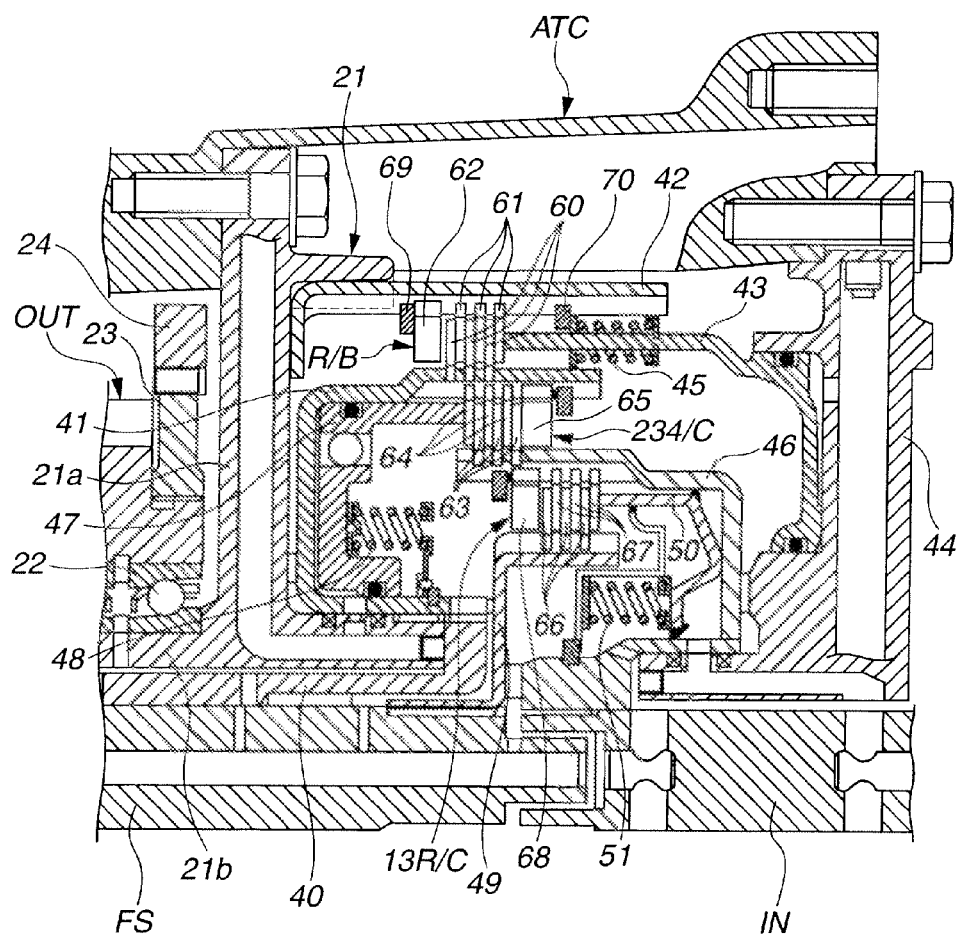
FIG. 5 is a sectional view a front side of the automatic transmission according to the first embodiment, which is nearer to the driving source than the output gear.

As shown in FIG. 5, in the front side region which is nearer to the driving source than output gear OUT, three friction engagement elements of first clutch 13R/C, second clutch 234/C, and fifth brake R/B are disposed in the internal space of automatic transmission case ATC. These friction engagement elements are arranged in the radial direction in the following manner. Fifth brake R/B is disposed on the radially outermost side. Second clutch 234/C is disposed radially inside fifth brake R/B. First clutch 13R/C is disposed radially inside second clutch 234/C. That is, second clutch 234/C is disposed radially between fifth brake R/B and first clutch 13R/C.

As shown in FIG. 5, fifth brake R/B is disposed on the radially outermost position among the three friction engagement elements disposed in the front side region which is nearer to the driving source than output gear OUT. Three friction plates 60 of fifth brake R/B are fit over and splined to an outer circumference of a first drum member 41 connected with front carrier plate 27 located at the front end portion of common carrier C through a cylindrical connection plate 40. Three friction mating plates 61 of fifth brake R/B and a retaining plate 62 are fit in and splined to a fifth brake drum 42 fixed to wall portion 21a of intermediate wall 21. A fifth brake piston 43 of fifth brake R/B is disposed on the front side of fifth brake R/B, in a piston cylinder which is an annular groove formed in a separation wall 44 fixed to automatic transmission case ATC. A fifth brake return spring 45 is disposed between fifth brake drum 42 and fifth brake piston 43.

As shown in FIG. 5, second clutch 234/C is disposed radially inside fifth brake R/B, at an axial position at which second clutch 234/C is partially overlapped with fifth brake R/B in the radial direction. Three friction plates 63 of second clutch 234/C are fit over and splined to the outer circumference of second drum member 46 connected and fixed to input shaft IN by splines. Three friction mating plates 64 of second clutch 234/C and a retaining plate 65 are fit in and splined to an inner circumference of first drum member 41. A second clutch piston 47 of second clutch 234/C is disposed on the rear side of second clutch 234/C, in a piston cylinder formed in first drum member 41. A second clutch return spring 48 is disposed between first drum member 41 and second clutch piston 47. That is, second clutch 234/C is disposed radially inside first drum member 41. Fifth brake R/B is disposed radially outside first drum member 41. In this way, first drum member 41 serves as a common drum member for second clutch 234/C and fifth brake R/B.

As shown in FIG. 5, first clutch 13R/C is disposed radially inside second clutch 234/C, at a position at which first clutch 13R/C is partially overlapped with second clutch 234/C in the radial direction. Three friction plates 66 of first clutch 13R/C are fit over and splined to an outer circumference of a first hub member 49 which passes through a region radially inside first drum member 41, and which is connected through front sun gear shaft FS to front sun gear Ss. Three friction mating plates 67 of first clutch 13R/C and a retaining plate 68 are fit in and splined to an inner circumference of a second drum member 46 connected and fixed to input shaft IN by splines A first clutch piston 50 of first clutch 13R/C is disposed on the front side of first clutch 13R/C, in a piston cylinder formed in second drum member 46. A first clutch return spring 51 is disposed between second drum member 46 and first clutch piston 50. That is, first clutch 13R/C is disposed radially inside second drum member 46. Second clutch 234/C is disposed radially outside second drum member 46. In this way, second drum member 46 serves as a common drum member for first clutch 13R/C and second clutch 234/C.

The three friction engagement elements disposed in the front side region which is nearer to the driving source than output gear OUT as described above are set to the following relationship. Outside diameters of friction plates 66 and friction mating plates 67 of first clutch 13R/C are set smaller than inside diameters of friction plates 63 and friction mating plates 64 of second clutch 234/C. Outside diameters of friction plates 63 and friction mating plates 64 of second clutch 234/C are set smaller than inside diameters of friction plates 60 and friction mating plates 61 of fifth brake R/B. The number of friction plates 66 of first clutch 13R/C, the number of friction plates 63 of second clutch 234/C, and the number of friction plates 60 of fifth brake R/B are set to the same number, that is, 3. Similarly, the number of friction mating plates 67 of first clutch 13R/C, the number of friction mating plates 64 of second clutch 234/C, and the number of friction mating plates 61 of fifth brake R/B are set to the same number, that is, 3.

In the specification, "friction plate" means the clutch plate or the brake plate which is fit over and splined to the splines formed on the outer circumference of the drum member or the hub member. In this case, friction material may be attached to both surfaces of the friction plate, and the friction material may be attached to one surface of the friction plate. Moreover, "friction mating plate" means the clutch plate or the brake plate which is fit in and splined to the splines formed on the inner circumference of the drum member or the hub member. In this case, the friction material may not be attached to the friction mating plate, and the friction material may be attached to the friction mating plate.

Next, effects and functions will be explained. First, "problems in the conventional example" will be explained. The operations in the automatic transmission according to the first embodiment will be illustrated with respect to "shift operation at each gear stage", "improvement in vehicle mountability and function of suppression of size increase of carrier", "function of arrangement of friction engagement elements disposed on front side", "function of lubrication of friction engagement elements disposed on front side", and "drum holding function of fifth brake".

[Problems in Comparative Example]

In this case, an automatic transmission shown in FIG. 9 of U.S. Pat. No. 5,951,433 is employed as the comparative example. This automatic transmission of the comparative example attains four speeds by using Ravigneaux planetary gear set PGU, and by combination of engagements and disengagements of two clutches and three brakes.

As described in the above-described patent document, in recent years, there is intense demand for a size reduction and a cost reduction of the automatic transmission. However, there are two below-described problems in the arrangement shown in the comparative example.

(1) Inferiority in Vehicle Mountability

At a rear end side of the automatic transmission, there is a vehicle body frame. Accordingly, the vehicle mountability becomes better as the diameter of the rear end side of the automatic transmission is smaller. However, in the comparative example, first brake B-1 is disposed on the front side of the output gear (on the side near the driving source). First clutch C-1, second clutch C-2, second brake B-2, and third brake B-3 are disposed on the rear side of the output gear (the side farther from the driving source). That is, one friction engagement element is disposed on the front side of the output gear, and the four friction engagement elements are disposed on the rear side of the output gear. The case diameter on the rear end side of the automatic transmission case which receives the four friction engagement elements becomes large. Accordingly, it is necessary to determine the installation position of the automatic transmission so as to avoid the interference with the vehicle body frame located on the rear end side of the automatic transmission when the automatic transmission is mounted on the vehicle. Accordingly, the degree of freedom of the installation of the automatic transmission is restricted.

(2) Size Increase of Common Carrier and Cost Increase

In the comparative example, the rotary members from the common carrier to the second clutch C-2 are disposed between two sun gears S1 and S2. Accordingly, it is necessary to add, as a carrier plate, one center carrier plate at a central portion of the common carrier. Therefore, the size of the common carrier is increased, and the cost is increased. These reasons will be explained by referring to FIG. 6.

As shown in FIGS. 6A and 6B, it is necessary to form, in the center carrier plate having a doughnut shape (annular shape), long pinion holes (for example, three long pinion holes) through which the long pinion gears pass. By setting of these long pinion holes, below-described restriction conditions are imposed.

1) The outside diameter of the center carrier plate becomes large for ensuring the radial thickness between the long pinion holes and the outer circumference of the center carrier plate.

2) The inside diameter of the center carrier plate becomes small for ensuring the radial thickness between the long pinion holes and the inner circumference of the center carrier plate. With this, it is not possible to assemble the sun gear.

3) It is necessary to increase the thickness of the plate for ensuring the strength of the center carrier plate since there are the long pinion holes through which the long pinion gears pass.

Accordingly, the added one center carrier plate has the large thickness and the large outside diameter so as to satisfy the restriction conditions 1), 2), and 3). Therefore, the size of the common carrier is increased in the axial direction and in the radial direction. Moreover, the center carrier plate is the additional member, so that the cost is increased.

Besides, when the center carrier plate has no long pinion gear holes through which the long pinion gears pass so as not to impose the restriction conditions 1), 2), and 3), it is necessary to divide each of the long pinion gears to two. That is, in case of Ravigneaux planetary gear set using three long pinion gears, the number of the long pinion gears becomes six. Accordingly, the cost is increased by the increase of the number of the components.

[Shift Operation at Each Gear Stage]

Ravigneaux planetary gear set PGU includes front sun gear Ss, rear sun gear Sd, ring gear R, and common carrier R, as four rotation elements whose rotation speed relationship is aligned in the straight line in the speed diagram. Hereinafter, the shift operation at the each gear stage which is obtained by varying the rotation speed relationship among the four rotation elements will be illustrated with reference to FIGS. 7-11.

(First Speed)

Figure 7B:
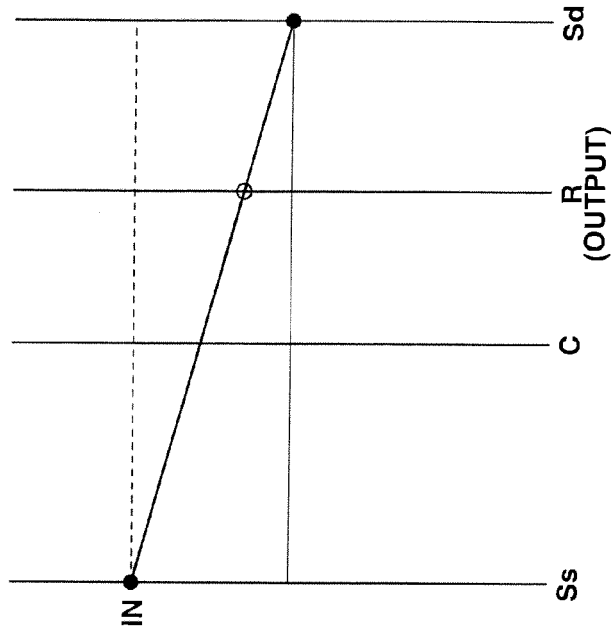
FIGS. 7A and 7B are explanatory diagrams showing a shift operation at a first speed (1st) in the automatic transmission according to the first embodiment.
Figure 7A:
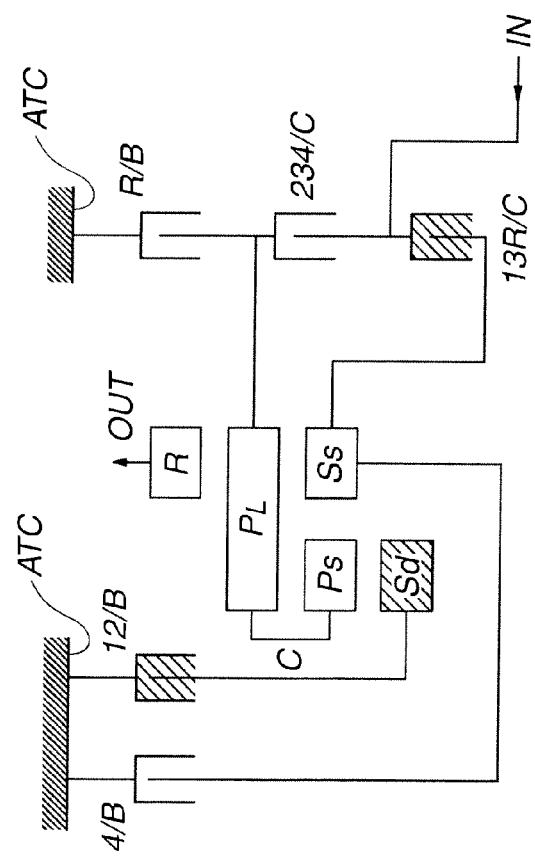

At the first speed (1st), first clutch 13R/C and third brake 12/B are brought into simultaneous engagement as indicated by hatching in FIG. 7A. Rear sun gear Sd is fixed to automatic transmission case ATC by the engagement of third brake 12/B.

Accordingly, when the input rotation speed is inputted through input shaft IN to front sun gear Ss, the rotation speed relationship among front sun gear Ss, common carrier C, ring gear R, and rear sun gear Sd is defined by one straight line by rear sun gear Sd being fixed, as shown in FIG. 7B. That is, the rotation speed of common carrier C is reduced relative to the rotation speed of front sun gear Ss. The rotation speed of ring gear R is further reduced relative to the rotation speed of common carrier C. In this way, the rotation speed of ring gear R which is obtained by reducing the input rotation speed to front sun gear Ss is directly transmitted to output gear OUT, so that the first speed is attained.

(Second Speed)

Figure 8B:
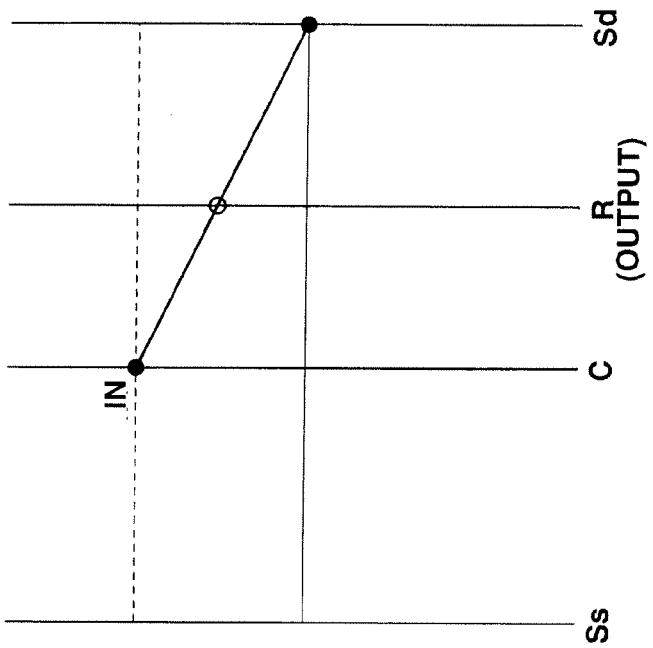
FIGS. 8A and 8B are explanatory diagrams showing a shift operation at a second speed (2nd) in the automatic transmission according to the first embodiment.
Figure 8A:
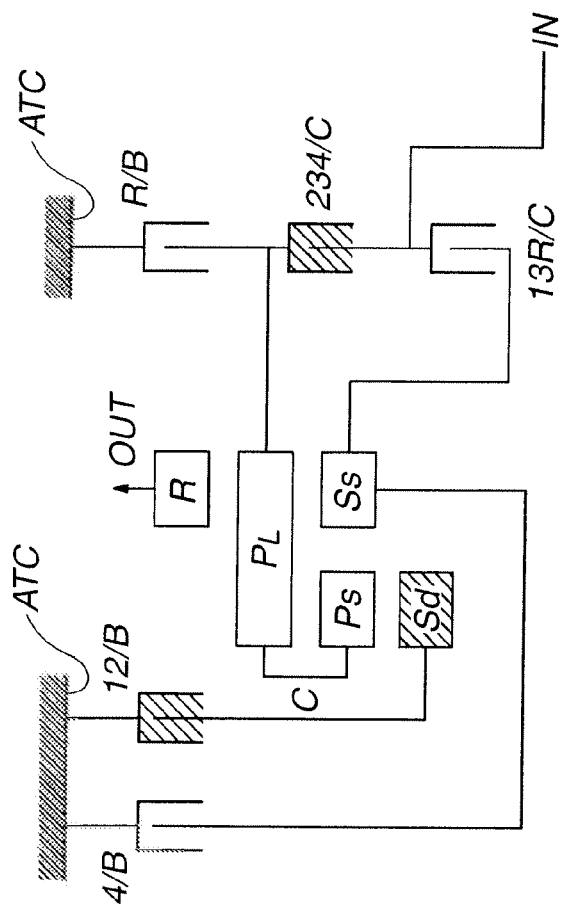

At the second speed (2nd), second clutch 234/C and third brake 12/B are brought into the simultaneous engagement as indicated by hatching in FIG. 8A. Rear sun gear Sd is fixed to automatic transmission case ATC by the engagement of third brake 12/B.

Accordingly, when the input rotation speed is inputted through input shaft IN to common carrier C, the rotation speed relationship among common carrier C, ring gear R, and rear sun gear Sd is defined by one straight line by ring gear Sd being fixed, as shown in FIG. 8B. That is, the rotation speed of ring gear R is reduced relative to the rotation speed of common carrier C. In this way, the rotation speed of ring gear R which is obtained by reducing the input rotation to common carrier C is directly transmitted to output gear OUT, so that the second speed (second underdrive gear stage) is attained.

(Third Speed)

At the third speed (3rd), first clutch 13R/C and second clutch 234/C are brought into the simultaneous engagement, as indicated by hatching in FIG. 9A.

Accordingly, when the input rotation speed is inputted through input shaft IN to front sun gear Ss and common carrier C, front sun gear Ss, common carrier C, and ring gear R of three rotation elements of Ravigneaux planetary gear set PGU rotate as a unit, as shown in FIG. 9B. In this way, the rotation speed of ring gear R which is identical to the input rotation speed to front sun gear Ss and common carrier C is directly transmitted to output gear OUT, so that the third speed (direct drive gear stage) is attained.

(Fourth Speed)

Figure 10B:
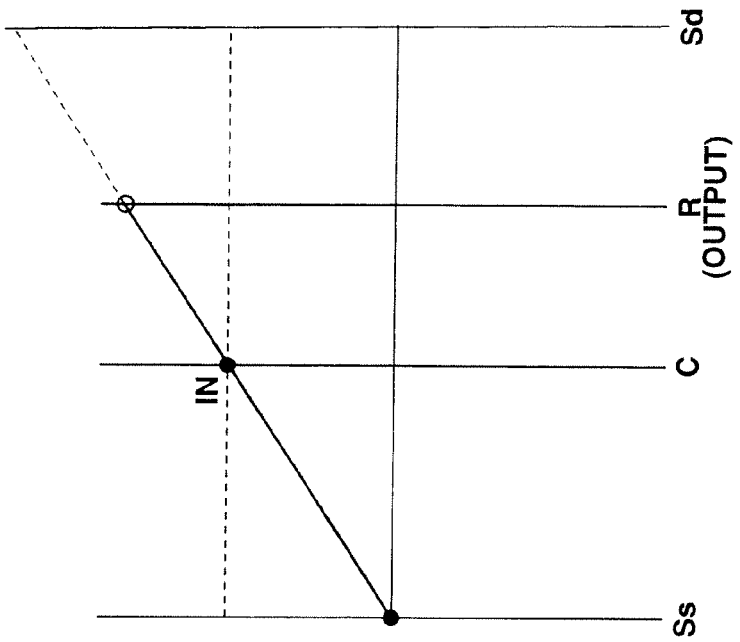
FIGS. 10A and 10B are explanatory diagrams showing a shift operation at a fourth speed (4th) in the automatic transmission according to the first embodiment.
Figure 10A:
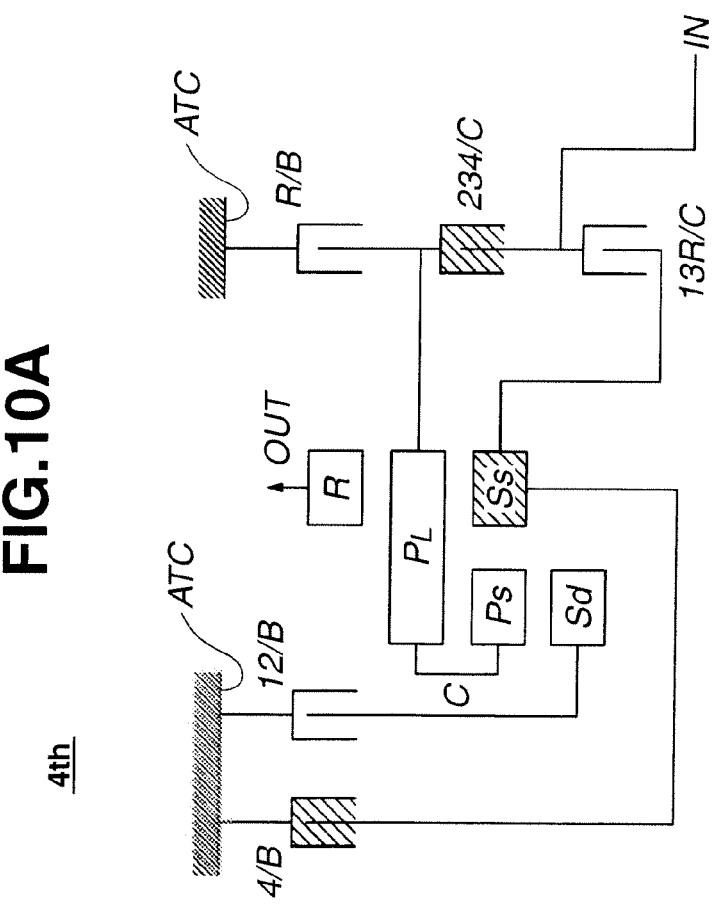

At the fourth speed, second clutch 234/C and fourth brake 4/B are brought into the simultaneous engagement, as indicated by hatching in FIG. 10A. Front sun gear Ss is fixed to automatic transmission case ATC by the engagement of fourth brake 4/B.

Accordingly, when the input rotation speed is inputted through input shaft IN to common carrier C, the rotation speed relationship among front sun gear Ss, common carrier C, and ring gear R is defined by one straight line by front sun gear Ss being fixed, as shown in FIG. 10B. That is, the rotation speed of ring gear R is increased relative to the rotation speed of common carrier C (=the input rotation speed). In this way, the rotation speed of ring gear R which is obtained by increasing the input rotation speed to common carrier C is directly transmitted to output gear OUT, so that the fourth speed (overdrive gear stage) is attained.

(Reverse Speed)

Figure 11A:
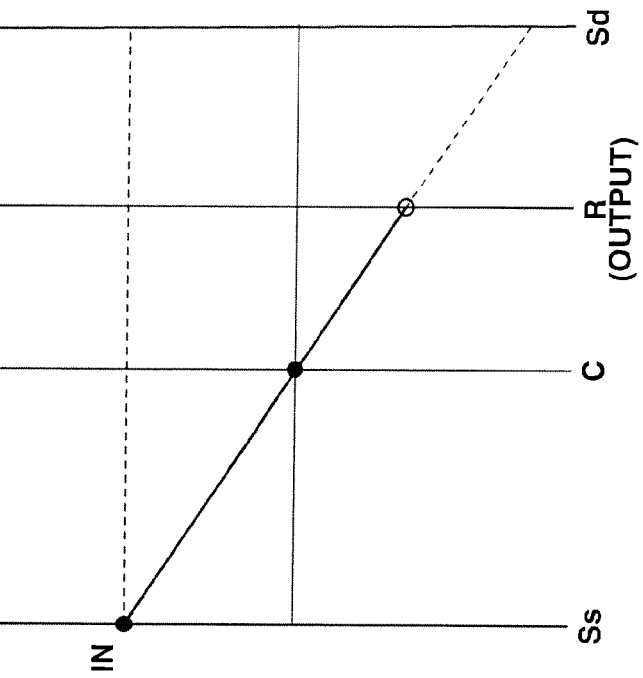
FIGS. 11A and 11B are explanatory diagrams showing a shift operation at a reverse speed (Rev) in the automatic transmission according to the first embodiment.

At the reverse speed (Rev), first clutch 13R/C and fifth brake R/B are brought into the simultaneous engagement, as indicated by hatching in FIG. 11A. Common carrier C is fixed to automatic transmission case ATC by the engagement of fifth brake R/B.

Figure 11B:
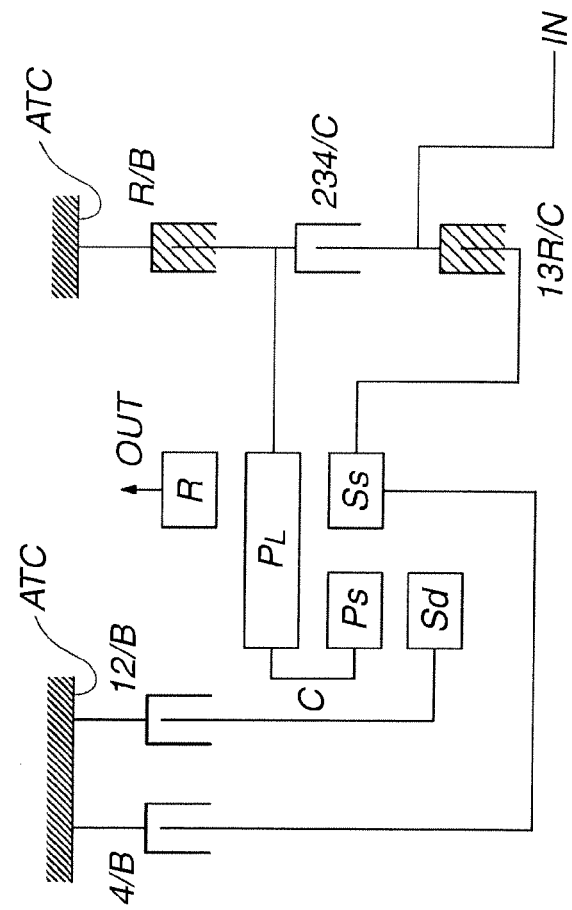

Accordingly, when the input rotation speed is inputted through input shaft IN to front sun gear Ss, the rotation speed relationship among front sun gear Ss, common carrier C, and ring gear R is defined by one straight line by common carrier C being fixed, as shown in FIG. 11B. That is, the rotation of ring gear R is reduced in the direction opposite to the input rotation direction of front sun gear Ss. In this way, the rotation speed of ring gear R which is obtained by reducing the input rotation to front sun gear Ss in the opposite direction is directly transmitted to output gear OUT, so that the reverse speed is attained.

[Improvement in Vehicle Mountability and Function of Suppression of Size Increase]

For achieving the practical use of the automatic transmission having a concept of the size reduction and the cost reduction, it is necessary to solve "inferiority in vehicle mountability" and "size increase of common carrier, and cost increase" which have not been solved by the conventional example. Hereinafter, the improvement in the vehicle mountability and the function of suppression of the size increase will be illustrated.

In the automatic transmission according to the first embodiment, first drum member 41, second drum member 46, and first hub member 49 are disposed at appropriate positions, so that the three friction engagement elements of first clutch 13R/C, second clutch 234/C, and fifth brake R/B are disposed on the front side of output gear OUT. Accordingly, the number of the friction engagement elements disposed on the rear side of output gear OUT are two, that is, third brake 12/B and fourth brake 4/B. Consequently, it is possible to decrease case diameter Dr on the rear end side of automatic transmission case ATC, relative to the comparative example in which the four friction engagement elements are disposed on the rear side of the output member. In this way, it is possible to is prevent the interference with vehicle body frame 20 located on the rear end side of automatic transmission case ATC, by decreasing case diameter Dr on the rear end side of automatic transmission case ATC, as shown in FIGS. 1 and 4. Therefore, it is possible to improve the vehicle mountability.

Moreover, in the automatic transmission according to the first embodiment, first drum member 41 is connected to front carrier plate 27 located at the front end portion of common carrier C. Second clutch 234/C is disposed radially inside this first drum member 41, and fifth brake R/B is disposed radially outside this first drum member 41. That is, the rotary members from common carrier C to second clutch 234/C use existing front carrier plate 27 connected to the front end portion of common carrier C for supporting long pinion gears $P_L$. Accordingly, it is unnecessary to add one center carrier plate at the central portion of the common carrier between the two sun gears, unlike the comparative example. In this way, it is possible to suppress the size increase of common carrier C due to the addition of the center carrier plate, and to decrease the cost, by using the existing front carrier plate 27 for the rotation members from common carrier C to second clutch 234/C.

[Function of Arrangement of Friction to Engagement Elements Disposed on Front Side]

In the automatic transmission according to the first embodiment, it is necessary to consider how the three friction engagement elements are received in a compact manner, in accordance with the arrangement in which the three friction engagement elements are disposed on the front side of the output gear OUT. Hereinafter, the function of the arrangement of the friction engagement elements disposed on the front side will be illustrated.

In the automatic transmission according to the first embodiment, second clutch 234/C is disposed radially inside fifth brake R/B. First clutch 13R/C is disposed radially inside second clutch 234/C.

With this, it is possible to dispose the three friction engagement elements disposed on the front side of output gear OUT in the compact manner. Hereinafter, the reasons of this compact disposition are illustrated.

When these three friction engagement elements are disposed to be overlapped with each other in the radial direction so as to prevent the increase of the axial length of the automatic transmission, the area of each of the friction plates of one of the friction engagement elements becomes larger as the one of the friction engagement elements is positioned at more radially outside position. Accordingly, the transmission torque of the friction engagement element is easy to increase.

Figures 12, 13:
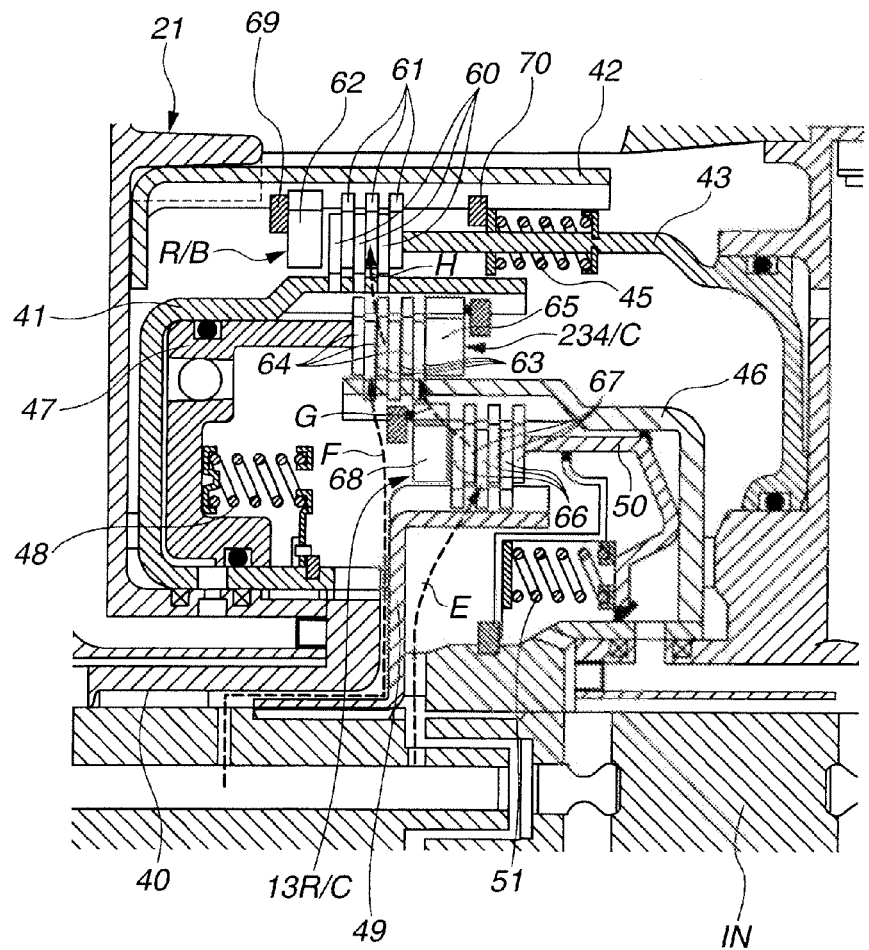
FIG. 12 is a table showing torque sharing rates of friction engagement elements at each gear stage in the automatic transmission according to the first embodiment.
FIG. 13 is an explanatory view showing a lubricant path on the front side which is nearer to the driving source than the output gear in the automatic transmission according to the first embodiment.

In the skeleton diagram according to the first embodiment, a torque sharing ratio of each friction engagement element at each gear stage is represented as shown in a table of FIG. 12. In FIG. 12, a symbol $\alpha f$ represents a gear ratio ($\alpha f=Zss/Zr$) on the front side (the single pinion gear's side), where a symbol Zss is the number of teeth of front sun gear Ss, and a symbol Zr is the number of the teeth of ring gear R, a symbol $\alpha r$ represents a gear ratio ($\alpha r=Zsd/Zr$) on the rear side (the double pinion gear's side), where a symbol Zsd is the number of the teeth of rear sun gear Sd, and the symbol Zr is the number of the ring gear R.

Usually, the number of the sun gear<the number of the ring gear is satisfied. Accordingly, the gear ratios $\alpha f$ and $\alpha r$ are smaller than 1. Therefore, the maximum torque sharing ratio of each clutch is represented in the following manner.

A maximum torque sharing ratio of fifth brake R/B: $(1+\alpha f)/\alpha f$

A maximum torque sharing ratio of second clutch 234/C: $\alpha f+1$

A maximum torque sharing ratio of first clutch 13R/C: 1

A maximum torque sharing ratio of third brake 12/B: $(\alpha r(1+\alpha f))/(\alpha f(1-\alpha r))$ A maximum torque sharing ratio of fourth brake 4/B: $\alpha f/(1+\alpha f)$ As is evident from the above-described torque sharing ratio, the relationship of the maximum torque sharing ratio of fifth brake R/B>the maximum torque sharing ratio of second clutch 234/C>the maximum torque sharing ratio of first clutch 13R/C is satisfied. In this case, when the friction engagement element with the large maximum torque sharing ratio is disposed at the radially inside position, it is necessary to increase the number of the clutch plates, relative to a case where that friction engagement element is disposed at the radially outside position.

On the other hand, in the automatic transmission according to the first embodiment, second clutch 234/C is disposed radially inside fifth brake R/B, and first clutch 13R/C is disposed radially inside second clutch 234/C. That is, the three friction engagement elements disposed on the front side of output gear OUT are disposed at more radially outside positions as the maximum torque sharing ratio becomes larger. Accordingly, it is possible to decrease the sizes of these three friction engagement elements.

On the other hand, it is conceivable to increase the pressing force, and to increase the friction coefficient $\mu$ for increasing the transmission torque of the clutch. However, it is necessary to increase the pressure receiving area of the piston for increasing the pressing force. Moreover, when the friction coefficient $\mu$ is increased, the gain of the clutch torque is increased with respect to the hydraulic pressure to the piston, so that controllability is deteriorated.

In the automatic transmission according to the first embodiment, the outside diameters of friction plates 66 and friction mating plates 67 of first clutch 13R/C are set to be smaller than the inside diameters of friction plates 63 and friction mating plates 64 of second clutch 234/C. Moreover, the outside diameters of friction plates 63 and friction mating plates 64 of second clutch 234/C are set to be smaller than the inside diameters of friction plates 60 and friction mating plates 61 of fifth brake R/B. Furthermore, the number of friction plates 66 of first clutch 13R/C, the number of friction plates 63 of second clutch 234/C, and the number of friction plates 60 of fifth brake R/B are set to the same number of 3. Similarly, the number of friction mating plates 67 of first clutch 13R/C, the number of friction mating plates 64 of second clutch 234/C, and the number of friction mating plates 61 of fifth brake 61 are set to the same number of 3.

Accordingly, it is possible to form friction plates 66, 63, and 60 of first clutch 13/R, second clutch 234/C, and fifth brake R/B disposed on the front side, punching out the three-tiered plate materials by multiple blanking. In this case, the multiple blanking means that plates with different diameters are punched out from one plate material. Similarly, it is possible to punch out friction mating plates 67, 64, and 61 of first clutch 13/R, second clutch 234/C, and fifth brake R/B disposed on the front side, from the three-tiered plate materials by the multiple blanking. In this way, it is possible to form friction plates 66, 63, and 60 and friction mating plates 67, 64, and 61 of first clutch 13R/C, second clutch 234/C, and fifth brake R/B which are disposed on the front side, respectively, from the three-tiered plate materials by the multiple blanking.

With this, it is possible to decrease the manufacturing cost of the friction engagement members (friction plates 66, 63, and 60 and friction mating plates 67, 64, and 61).

Moreover, in the automatic transmission according to the first embodiment, first clutch 13R/C, second clutch 234/C, fifth brake R/B have the different maximum torque sharing ratios, as described above. However, the necessary number of each of the friction engagement elements is set to the same number of 3 by disposing these friction engagement elements at the different radial positions. With this, it is possible to make up the number of the friction engagement members necessary for first clutch 13R/C, second clutch 234/C, and fifth brake R/B by preparing two sets of the three plate materials for the friction plates and the friction mating plates, and by punching out the respective sets of the three plate materials in the three-tiered manner by the multiple blanking.

[Function of Lubrication of Friction Engagement Elements Disposed on Front Side]

In the automatic transmission according to the first embodiment, the three friction engagement elements are disposed on the front side of the output gear OUT at the different radial positions. Accordingly, it is necessary to devise to lubricate the three friction engagement elements. Hereinafter, the function of this lubrication of the friction engagement elements disposed on the front side will be illustrated with reference to FIG. 13.

At the shift between the first speed and the second speed, the control of the changeover (replacement) between first clutch 13R/C and second clutch 234/C is performed as shown in FIG. 3. During the control of the changeover between first clutch 13R/C and second clutch 234/C, both of first clutch 13R/C and second clutch 234/C are brought into the slip state. Accordingly, it is necessary to lubricate and cool both of first clutch 13R/C and second clutch 234/C at the shift between the first speed and the second speed.

On the other hand, in the automatic transmission according to the first embodiment, second clutch 234/C is disposed radially outside first clutch 13R/C, at the axial position at which second clutch 234/C is overlapped with first clutch 13R/C in the radial direction. With this, it is possible to effectively lubricate first clutch 13R/C and second clutch 234/C.

For example, when first clutch 13R/C and second clutch 234/C are apart from each other, or when first clutch 13R/C and second clutch 234/C are arranged side by side with each other in the axial direction, the oil which has been lubricated and cooled first clutch 13R/C is merely returned to the oil chamber. Accordingly, the lubrication efficiency is deteriorated.

Contrarily, in the automatic transmission according to the first embodiment, the lubricating oil supplied from the hydraulic passage formed in front sun gear shaft FS to the front side of first hub member 49 flows in the radial direction as shown by an arrow E in FIG. 13, passes through the hole formed in first hub member 49, and lubricates and cools first clutch 13R/C. Besides, in the lubricating path, holes (not shown) are formed in the drum (and the hub). The lubricating oil flows through the holes of the drum to the radially outer side.

On the other hand, the lubricating oil supplied from the hydraulic passage formed in front sun gear shaft FS to the rear side of first hub member 49 flows in the radial direction as shown by an arrow F in FIG. 13, passes through the hole formed in second drum member 46, and lubricates and cools second clutch 234/C. In addition, the lubricating oil which has been lubricated and the cooled first clutch 13R/C flows in the radial direction as shown by an arrow G in FIG. 13, passes through the hole formed in second drum member 46, and lubricates and cools second clutch 234/C.

The lubricating oil which has been lubricated and cooled first clutch 13R/C and second clutch 234/C flows in the radial direction as shown by an arrow H in FIG. 13, passes through the hole formed in first drum member 41, and lubricates and cools fifth brake R/B.

In this way, the oil which has been lubricated and cooled the friction plates of first clutch 13R/C lubricates and cools second clutch 234/C. With this, it is possible to effectively lubricate first clutch 13R/C and second clutch 234/C. Accordingly, it is possible to meet the high lubrication request and the high cooling request for first clutch 13R/C and second clutch 234/C at the shift between the first speed and the second speed.

[Drum Holding Function of Fifth Brake]

In the automatic transmission according to the first embodiment, friction mating plates 61 of fifth brake R/B are not held by automatic transmission case ATC. Friction mating plates 61 of fifth brake R/B are held by fifth brake drum 42. Hereinafter, the drum holding function of fifth brake drum R/B will be illustrated with reference to FIG. 5.

As shown in FIGS. 1 and 5, fifth brake drum 42 includes the splines formed around the entire inner circumference of fifth brake drum 42, and arranged to be engaged with friction mating plates 61 of fifth brake R/B.

That is, even though the friction mating plates of the fifth brake are held by the automatic transmission case, the splines may not be formed on the automatic transmission case around the entire outer circumference of the fifth brake. Accordingly, a part of the splines of the friction mating plates may not be fit in and splined to the automatic transmission case. In this case, the holding of the friction mating plates at the engagement of the fifth brake is insufficient. Accordingly, the large torque may not be transmitted.

Moreover, in a case where the friction mating plates of the fifth brake are held by the automatic transmission case, the outside diameter of the fifth brake becomes unnecessarily large. With this, the members such as the hub becomes large. Accordingly, the weight is increased, and the cost is increased.

Contrarily, in the automatic transmission according to the first embodiment, fifth brake drum 42 is provided. With this, it is possible to form the splines arranged to be engaged with friction mating plates 61 of fifth brake R/B, around the entire inner circumference of fifth brake drum 42. That is, it is possible to sufficiently ensure the holding of friction mating plates 61 at the engagement of fifth brake R/B, relative to a case where the friction mating plates of the fifth brake are held by the automatic transmission case. In addition, it is possible to suppress the outside diameter of fifth brake R/B to the small size relative to the case where the friction mating plates of the fifth brake are held by the automatic transmission case, and thereby to suppress the weight increase and the cost increase.

As shown in FIG. 5, fifth brake drum 42 is fit in and splined to intermediate wall 21. The drum bottom portion of fifth brake drum 42 is abutted on intermediate wall 21. A snap ring 69 is provided on fifth brake drum 42 on the rear side of friction plates 60 and friction mating plates 61. A snap ring 70 is provided on fifth brake drum 42 on the front side of friction plates 60 and friction mating plates 61. This snap ring 70 receives the reaction force of return spring 45 for returning fifth brake piston 43.

Accordingly, the power is transmitted between friction plates 60 and friction mating plates 61 by being pressed by fifth brake piston 43. When fifth brake piston 43 receives the hydraulic pressure and fifth brake piston 43 is moved in the rearward direction, fifth brake drum 42 receives the urging force in the rearward direction through return spring 45 and snap ring 70. With this, it is possible to prevent fifth brake drum 42 from dropping off, by this urging force. That is, it is possible to decrease the number of the components, relative to a case where fifth brake drum 42 is fixed to intermediate wall 21 by bolts for preventing fifth brake drum 42 from dropping off, and thereby to suppress the cost increase.

An automatic transmission according to the embodiments of the present invention includes: a Ravigneaux planetary gear set (PGU) including a front sun gear (Ss), a rear sun gear (Sd), a ring gear (R), a long pinion gear (PO engaged with the front sun gear (Ss) and the ring gear (R), a short pinion gear (Ps) engaged with the rear sun gear (Sd) and the long pinion gear (PO, and a common carrier (C) rotatably supporting the long pinion gear ($P_L$) and the short pinion gear ($P_s$); an input member (IN) arranged to input a rotation of a driving source; a first friction engagement element (13R/C) selectively connecting the input member (IN) and the front sun gear (Ss); a second friction engagement element (234/C) selectively connecting the input member (IN) and the common carrier (C); a third friction engagement element (12/B) selectively fixing the rear sun gear (Sd) to an automatic transmission case (ATC); a fourth friction engagement element (4/B) selectively fixing the front sun gear (Ss) to the automatic transmission case (ATC); a fifth friction engagement element (R/B) selectively fixing the common carrier (C) to the automatic transmission case (ATC); an output member (OUT) constantly connected with the ring gear (R), the automatic transmission being configured to attain four forward speeds and one reverse speed by a simultaneous engagement of two friction engagement elements selected from the first to fifth friction engagement elements (13R/C, 234/C, 12/B, 4/B, R/B), the first friction engagement element (13R/C), the second friction engagement element (234/C), and the fifth friction engagement element (R/B) being disposed on a front side which is nearer to the driving source than the output member (OUT), the third friction engagement element (12/B) and the fourth friction engagement element (4/B) being disposed on a rear side which is farther from the driving source than the output member (OUT), and a first drum member (41) that includes an inner circumference on which the second friction engagement element (234/C) is disposed, and an outer circumference on which the fifth friction engagement element (R/B) is disposed, and that is connected with a front carrier plate (27) located at a front end portion of the common carrier (C).

Accordingly, it is possible to improve the vehicle mountability, to suppress the size increase of common carrier C, and to reduce the cost.

In the automatic transmission according to the embodiments of the present invention, the second friction engagement element (234/C) is disposed radially between the fifth friction engagement element (R/B) and the first friction engagement element (13R/C) disposed radially inside the second friction engagement element (234/C), on the front side which is nearer to the driving source than the output member (OUT).

Accordingly, it is possible to suppress the number of the friction plates necessary for each of the three friction engagement elements disposed on the front side which is nearer to the driving source than the output member (output gear OUT), and to decrease the sizes of the three friction engagement elements.

In the automatic transmission according to the embodiments of the present invention, the automatic transmission further comprises an intermediate wall (21) which is disposed on the front side of the output member (OUT), and which includes a wall portion (21*a*) that is connected to the automatic transmission case (ATC), and that extends in the radial direction, and a cylindrical portion (21*b*) extending from the wall portion (21*a*) toward the rear side in the axial direction; the output member (OUT) is supported by the cylindrical portion (21*b*) of the intermediate wall (21); the first drum member (41) passes through a region radially inside the intermediate wall (21), and is connected to the front carrier plate (27); and the automatic transmission further comprises a second drum member (46) that includes an inner circumference on which the first friction engagement element (13R/C) is disposed, and an outer circumference on which the second friction engagement element (234/C) is disposed at an axial position at which the second friction engagement element (234/C) is overlapped with the first friction engagement element (13R/C) in the radial direction, and that is connected with the input member (IN), a first hub member (49) that includes an outer circumference on which the first friction engagement element (13R/C) is disposed, that passes through a region radially inside the first drum member (41), and that is connected to the front sun gear (Ss), and a second hub member (29) that includes an outer circumference on which the third friction engagement element (12/B) is disposed, and that passes through the rear side of the common carrier (C), and is connected with the rear sun gear (Sd), and a third hub member (33) that to includes an outer circumference on which the fourth friction engagement element (4/B) is disposed, and that passes through the rear side of the second hub member (29) and a region radially inside the rear sun gear (Sd), and is connected with the front sun gear (Ss).

Accordingly, it is possible to dispose the three friction engagement elements and the two friction engagement elements, on the front side which is nearer to the driving source than the output member (output gear OUT) and on the rear side which is farther from the driving source than the output member (output gear OUT), by disposing drum members 41 and 46 and hub members 49, 29, and 33 at appropriate positions. Moreover, it is possible to effectively lubricate the first friction engagement element (first clutch 13R/C) and the second friction element (second clutch 234/C) which are disposed at the axial positions at which the first friction engagement element and the second friction engagement element are overlapped with each other in the radial direction.

In the automatic transmission according to the embodiments of the present invention, friction plates (66) and friction mating plates (67) of the first friction engagement element (13R/C) have outside diameters smaller than inside diameters of friction plates (63) and friction mating plates (64) of the second friction engagement element (234/C); the friction plates (63) and the friction mating plates (64) of the second friction engagement element (234/C) have outside diameters smaller than inside diameters of friction plates (60) and friction mating plates (61) of the fifth friction engagement element (R/B); and the number of the friction plates (66) of the first friction engagement element (13R/C), the number of the friction plates (63) of the second engagement element (234/C), and the number of the friction plates (60) of the fifth friction engagement element (R/B) are set to the same number; and/or the number of the friction mating plates (67) of the first friction engagement element (13R/C), the number of the friction mating plates (64) of the second friction engagement element (234/C), and the number of the friction mating plates (61) of the fifth engagement element (R/B) are set to the same number.

Accordingly, it is possible to form the three friction engagement elements (friction plates 66, 63 60 and the friction mating plates 67, 64. 61) disposed on the front side, by the multiple blanking. With this, it is possible to decrease the manufacturing cost of the friction engagement members (friction plates 66, 63, and 60 and friction mating plates 67, 64, and 61). Moreover, in a case where the number of the friction engagement elements (friction plates 66, 63, and 60, and the friction mating plates 67. 64, and 61) are set to the same number, it is possible to make up the numbers necessary for the three friction engagement elements, by the multiple blanking by which the waste of the plate material is minimized.

In the automatic transmission according to the first embodiment, the numbers of friction plates 66, 63, and 60 and the numbers of friction mating plates 67, 64, and 61 of first clutch 13R/C, second clutch 234/C, and fifth brake R/B are the same number, that is, 3. However, it is optional that the numbers of one set of the friction plates and the friction mating plates of the first friction engagement element (first clutch 13R/C), the second friction engagement element (second clutch 234/C), and the fifth friction engagement element (fifth brake R/B) are set to the same number.

In the first embodiment, the friction materials are attached to friction plates 36, 38, 66, 63, and 60 which are engaged with the splines on the outer circumferences of drum members 41 and 46, and hub members 49, 29, and 33. However, the friction materials may be attached only to the friction mating plates which are engaged with the splines on the inner circumferences of the drum members and the automatic transmission case. The piston may be abutted on the friction plates which are engaged with the splines on the outer circumferences of the drum members and the hub members.

In the first embodiment, the automatic transmission is applied to a front-engine front-wheel-drive vehicle (i.e., a FF vehicle) in which an input shaft and an output shaft are arranged parallel to each other. However, the automatic transmission according to the embodiment can be applied to various vehicles such as a front-engine rear-wheel-drive vehicle (i.e., a FR vehicle), a hybrid vehicle which uses, as a driving source, at least one of an engine and a motor, and an electric vehicle and a fuel cell car which uses a motor as a driving source.

The entire contents of Japanese Patent Application No. 2011-126823 filed Jun. 7, 2011 are incorporated herein by reference.

Although the invention has been described above by reference to certain embodiments of the invention, the invention is not limited to the embodiments described above. Modifications and variations of the embodiments described above will occur to those skilled in the art in light is of the above teachings. The scope of the invention is defined with reference to the following claims.

What is claimed is:

1. An automatic transmission comprising:
a Ravigneaux planetary gear set including a front sun gear, a rear sun gear, a ring gear, a long pinion gear engaged with the front sun gear and the ring gear, a short pinion gear engaged with the rear sun gear and the long pinion gear, and a common carrier rotatably supporting the long pinion gear and the short pinion gear;
an input member arranged to input a rotation of a driving source;
a first friction engagement element selectively connecting the input member and the front sun gear;
a second friction engagement element selectively connecting the input member and the common carrier;
a third friction engagement element selectively fixing the rear sun gear to an automatic transmission case;
a fourth friction engagement element selectively fixing the front sun gear to the automatic transmission case;
a fifth friction engagement element selectively fixing the common carrier to the automatic transmission case;
an output member constantly connected with the ring gear, the automatic transmission being configured to attain four forward speeds and one reverse speed by simultaneous engagement of two friction engagement elements selected from the first to fifth friction engagement elements,
the first friction engagement element, the second friction engagement element, and the fifth friction engagement element being disposed on a front side which is nearer to the driving source than is the output member,
the third friction engagement element and the fourth friction engagement element being disposed on a rear side which is farther from the driving source than is the output member, and
a first drum member that includes an inner circumference on which the second friction engagement element is disposed, and an outer circumference on which the fifth friction engagement element is disposed, and that is arranged with a front carrier plate located at a front end portion of the common carrier.

2. The automatic transmission as claimed in claim 1, wherein:
the fifth friction engagement element is disposed radially outside the second friction engagement element, on the front side which is nearer to the driving source than is the output member, and
the first friction engagement element is disposed radially inside the second friction engagement element, on the front side which is nearer to the driving source than is the output member.

3. The automatic transmission as claimed in claim 1, wherein: the automatic transmission further comprises an intermediate wall which includes a wall portion disposed on the front side of the output member and which is connected to the automatic transmission case, and extends in the radial direction, and a cylindrical portion extending from the wall portion toward the rear side in the axial direction;
the output member is supported by the cylindrical portion of the intermediate wall; and
the first drum member passes through a region radially inside the intermediate wall, and is connected to the front carrier plate.

4. The automatic transmission as claimed in claim 1, wherein the automatic transmission further comprises:
a second drum member that includes an inner circumference on which the first friction engagement element is disposed, and an outer circumference on which the second friction engagement element is disposed at an axial position at which the second friction engagement element is overlapped with the first friction engagement element in the radial direction, and that is connected with the input member, and
a first hub member including an outer circumference on which the first friction engagement element is disposed, and which passes through a region radially inside the first drum member, and is connected to the front sun gear.

5. The automatic transmission as claimed in claim 1, wherein the automatic transmission further comprises:
a second hub member that includes an outer circumference on which the third friction engagement element is disposed, and that passes through the rear side of the common carrier, and is connected with the rear sun gear, and a third hub member that includes an outer circumference on which the fourth friction engagement element is disposed, and that passes through the rear side of the second hub member and a region radially inside the rear sun gear, and is connected with the front sun gear.

6. The automatic transmission as claimed in claim 1, wherein:
friction plates and friction mating plates of the first friction engagement element have outside diameters smaller than inside diameters of friction plates and friction mating plates of the second friction engagement element; and
the friction plates and the friction mating plates of the second friction engagement element have outside diameters smaller than inside diameters of friction plates and friction mating plates of the fifth friction engagement element.

7. The automatic transmission as claimed in claim 6, wherein the number of the friction plates of the first friction engagement element, the number of the friction plates of the second engagement element, and the number of the friction plates of the fifth friction engagement element are set to the same number.

8. The automatic transmission as claimed in claim 6, wherein the number of the friction mating plates of the first friction engagement element, the number of the friction mating plates of the second friction engagement element, and the number of the friction mating plates of the fifth engagement element are set to the same number.

* * * * *